US009018945B2

(12) United States Patent
Muto

(10) Patent No.: US 9,018,945 B2
(45) Date of Patent: Apr. 28, 2015

(54) RELATIVE ANGLE SENSING DEVICE HAVING A SOFT MAGNETIC BODY WITH INTEGRAL BRACKET

(75) Inventor: Hiroyuki Muto, Tochigi (JP)

(73) Assignee: Showa Corporation, Saitama (JP)

( * ) Notice: Subject to any disclaimer, the term of this patent is extended or adjusted under 35 U.S.C. 154(b) by 287 days.

(21) Appl. No.: 13/482,632

(22) Filed: May 29, 2012

(65) Prior Publication Data

US 2013/0093414 A1 Apr. 18, 2013

(30) Foreign Application Priority Data

Oct. 13, 2011 (JP) ................................ 2011-226019

(51) Int. Cl.
*G01B 7/30* (2006.01)
*G01L 3/10* (2006.01)
*B29C 45/16* (2006.01)
*G01D 5/245* (2006.01)

(52) U.S. Cl.
CPC ......... *G01L 3/104* (2013.01); *B29K 2995/0008* (2013.01); *B29C 45/1671* (2013.01); *G01D 5/2451* (2013.01)

(58) Field of Classification Search
USPC ............................ 324/207.2, 207.21, 207.25
See application file for complete search history.

(56) References Cited

U.S. PATENT DOCUMENTS 6,925,893 B2 * 8/2005 Abe et al. ................ 73/862.332
7,246,531 B2 * 7/2007 Nakane et al. ........... 73/862.332
8,390,276 B2 * 3/2013 McDonald et al. ...... 324/207.25
2002/0108454 A1 * 8/2002 Nakano et al. ........... 73/862.333
2003/0209087 A1 * 11/2003 Nakane et al. ........... 73/862.333
2008/0092670 A1 * 4/2008 Tokumoto et al. ....... 73/862.191

FOREIGN PATENT DOCUMENTS

JP 2002071478 A * 3/2002 ................ G01L 3/10
JP 2002071479 A * 3/2002 ................ G01L 3/10
JP 2009-168727 7/2009
KR 101103997 * 1/2012

* cited by examiner

*Primary Examiner* — Jay Patidar
(74) *Attorney, Agent, or Firm* — Leason Ellis LLP

(57) ABSTRACT

A relative angle sensing device that senses a relative angle between two rotary shafts is provided with: a hard magnetic body that is provided to one rotary shaft out of the two rotary shafts; a soft magnetic body that is provided to the other rotary shaft out of the two rotary shafts to be arranged in a magnetic field formed by the hard magnetic body, and forms a magnetic circuit together with the hard magnetic body; and a sensing unit that senses a magnetic flux density of the magnetic circuit. The soft magnetic body has a circular ring portion that is formed into a disc having, at an inside thereof, a hole larger than an outer shape of the hard magnetic body, and a protrusion that protrudes from a section of the circular ring portion at a hard magnetic body side in a shaft direction of the one rotary shaft.

4 Claims, 8 Drawing Sheets

160
M
10
230
CONTROL PORTION
220
TARGET CURRENT CALCULATING PORTION
215
CONVERTING PORTION
Td
v
Nms
T1
T2
52
OUTPUT PORTION
50
51
MEMORY PORTION

RELATIVE ANGLE SENSING DEVICE HAVING A SOFT MAGNETIC BODY WITH INTEGRAL BRACKET

CROSS REFERENCE TO RELATED APPLICATIONS

This application is based on and claims priority under 35 USC §119 from Japanese Patent Application No. 2011-226019 filed Oct. 13, 2011.

BACKGROUND

1. Technical Field

The present invention relates to a relative angle sensing device and a production method of a relative angle sensing device.

2. Related Art

In recent years, there has been suggested a technique for improving production yield of a torque sensing device (relative angle sensing device) used for an electric power steering apparatus.

For example, a torque sensing device described in Japanese Patent Application Laid Open Publication No. 2009-168727 has a following configuration. That is, the torque sensing device includes: a first shaft and a second shaft that are coaxially connected to each other through a connecting shaft; a permanent magnet that is fixed to the first shaft or one end of the connecting shaft; a pair of sensor yokes that is fixed to the second shaft or the other end of the connecting shaft and that forms a magnetic circuit together with the permanent magnet; and a pair of magnetism collection yokes that forms the magnetic circuit together with the permanent magnet and the pair of sensor yokes; and a magnetic flux sensing device that senses a magnetic flux induced by the sensor yokes and the magnetism collection yokes, and the torque sensing device senses the torque applied any one of the first shaft and the second shaft on the basis of output of the magnetic flux sensing device. The pair of sensor yokes is obtained by punching a pair of band-shaped sensor yoke components from a flat sheet component, and curving the pair of band-shaped sensor yoke components so as to be respectively formed into a ring.

SUMMARY

In general, a material used for a soft magnetic body such as a yoke forming a magnetic circuit together with a magnet is expensive. Thus, in order to achieve an inexpensive device, it is desirable that the amount of a material for producing the soft magnetic body is small.

An object of the present invention is to provide a device having a soft magnetic body whose amount used for production is reduced.

In order to attain the object, the present invention provides a relative angle sensing device that senses a relative angle between two rotary shafts including: a hard magnetic body that is provided to one rotary shaft out of the two rotary shafts; a soft magnetic body that is provided to the other rotary shaft out of the two rotary shafts to be arranged in a magnetic field formed by the hard magnetic body, and forms a magnetic circuit together with the hard magnetic body; and a sensing unit that senses a magnetic flux density of the magnetic circuit. The soft magnetic body is formed by injection molding by using a material obtained by mixing a magnetic powder and a synthetic resin.

Here, the magnetic powder that is the material of the soft magnetic body may contain nickel. Moreover, nickel may account for 40% or more of the magnetic powder that is the material of the soft magnetic body.

Further, the soft magnetic body has a circular ring portion that is formed into a disc having, at an inside thereof, a hole larger than an outer shape of the hard magnetic body, and a protrusion that is formed to protrude from a section of the circular ring portion at a hard magnetic body side in a shaft direction of the one rotary shaft, and distance from an outer section of the protrusion to the hard magnetic body increases from a tip end portion side toward the circular ring portion, and distance from an inner section of the protrusion to the hard magnetic body is substantially the same from the tip end portion side toward the circular ring portion.

From another standpoint, the present invention provides a production method of a relative angle sensing device sensing a relative angle between coaxially arranged two rotary shafts, and including a hard magnetic body that is provided to one rotary shaft out of the two rotary shafts, a soft magnetic body that is provided to the other rotary shaft out of the two rotary shafts to be arranged in a magnetic field formed by the hard magnetic body, and forms a magnetic circuit together with the hard magnetic body, and a sensing unit that senses a magnetic flux density of the magnetic circuit, the production method of the relative angle sensing device including: producing the soft magnetic body by injection molding by using a material obtained by mixing a magnetic powder and a synthetic resin.

According to the present invention, it is possible to reduce the amount of a material used for producing a soft magnetic body, and to provide an inexpensive device.

BRIEF DESCRIPTION OF THE DRAWINGS

Exemplary embodiment(s) of the present invention will be described in detail based on the following figures, wherein.

DETAILED DESCRIPTION

Hereinafter, a best mode (exemplary embodiment) for achieving the present invention will be described in detail with reference to the attached drawings.

Figure 1:
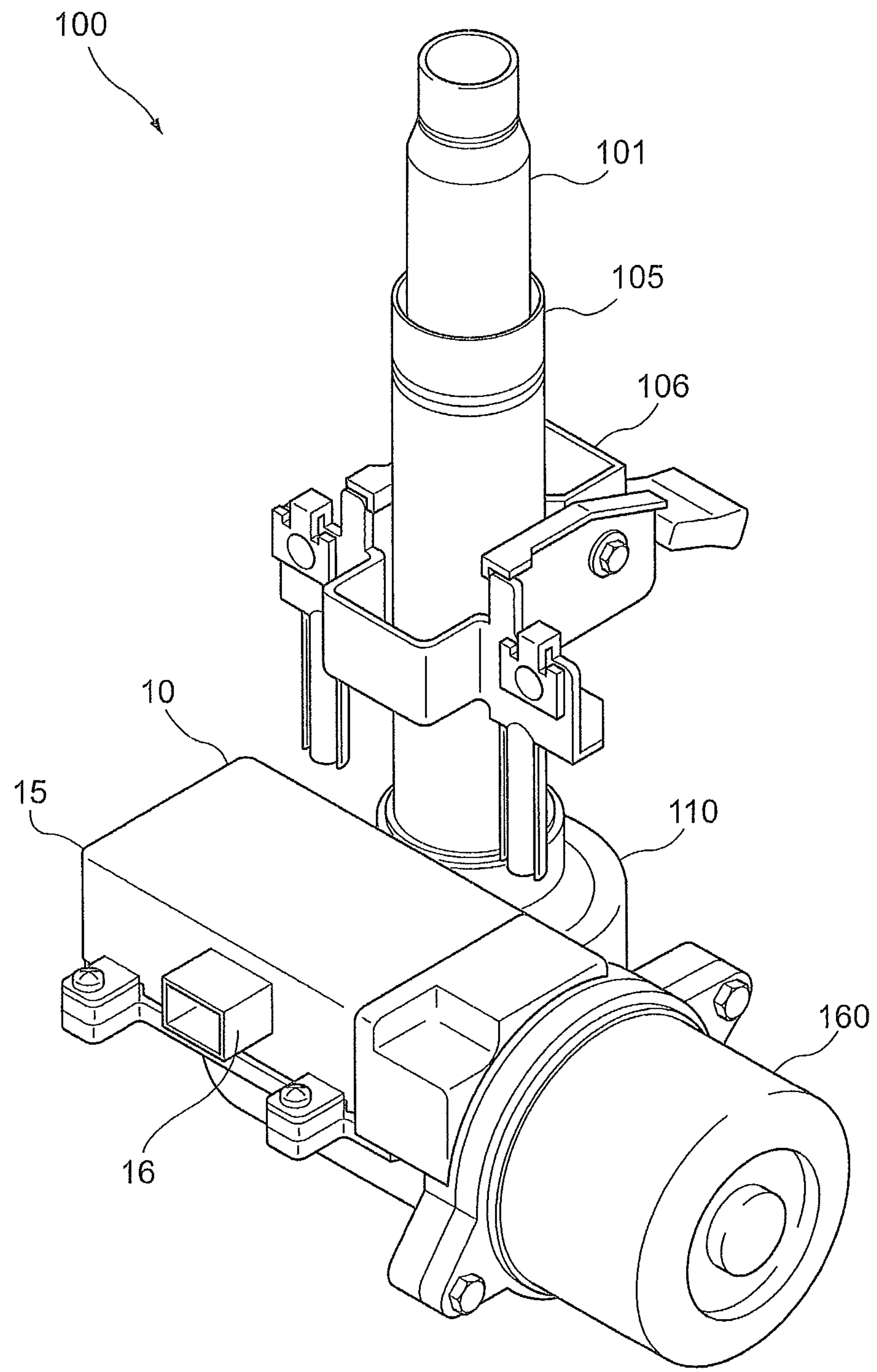
FIG. 1 is an external view of an electric power steering apparatus according to the exemplary embodiment.
Figure 2:
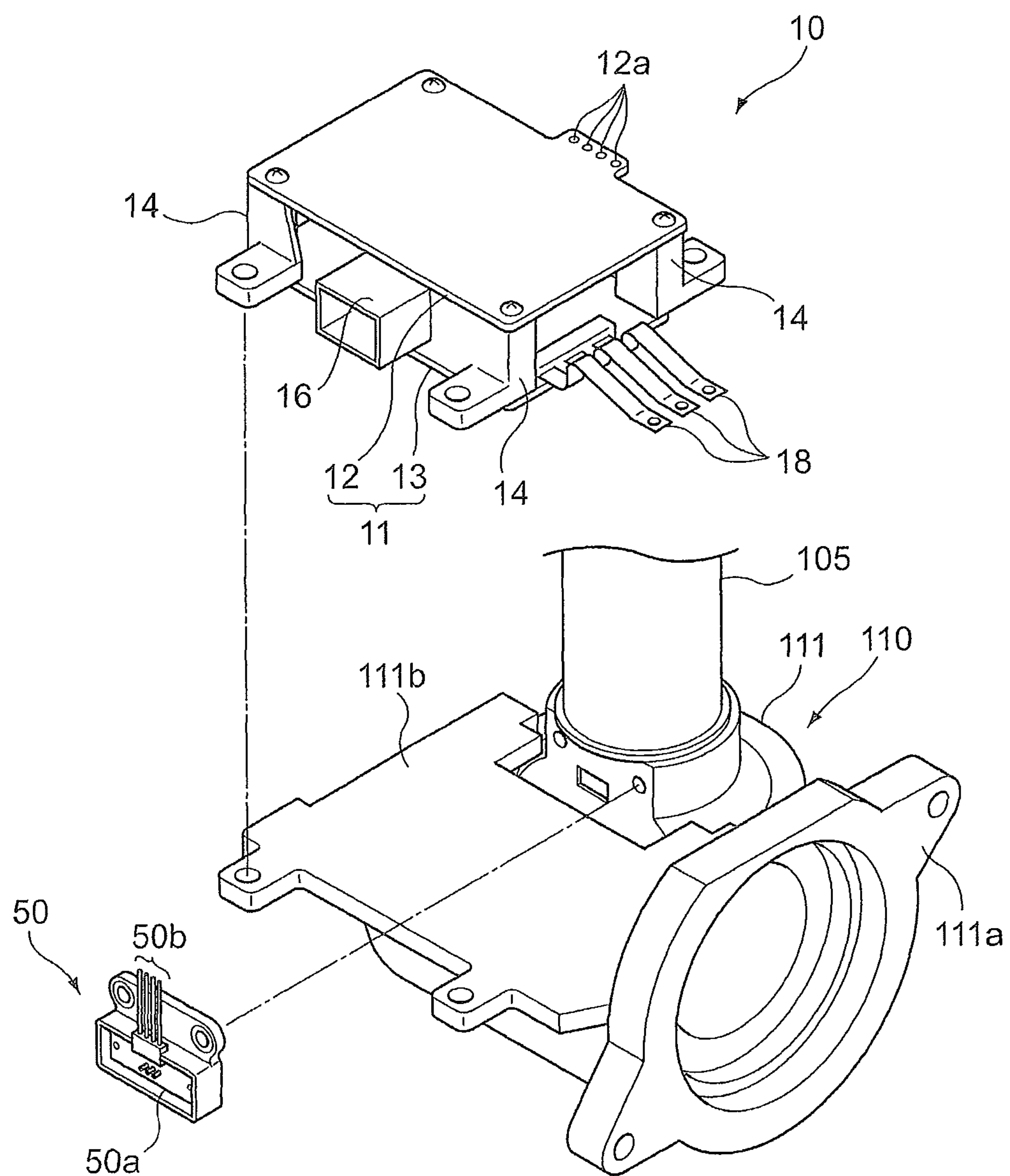
FIG. 2 is a schematic configuration diagram of the electric power steering apparatus.
Figure 3:
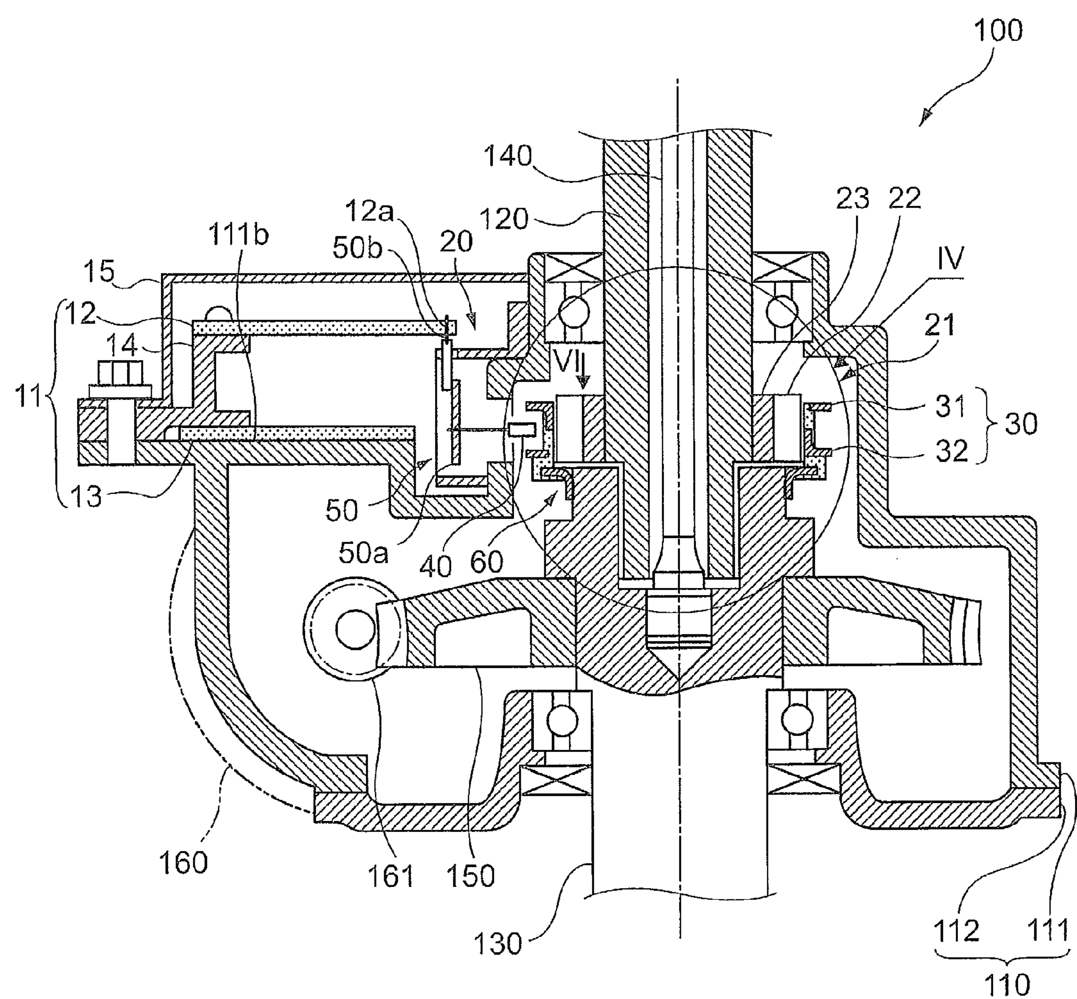
FIG. 3 is a cross-sectional view of the electric power steering apparatus.

FIG. 1 is an external view of an electric power steering apparatus 100 according to the exemplary embodiment. FIG. 2 is a schematic configuration diagram of the electric power steering apparatus 100. FIG. 3 is a cross-sectional view of the electric power steering apparatus 100. It should be noted that, in FIG. 2, a cover 15 of an ECU 10 which will be described later is omitted.

The electric power steering apparatus (hereinafter, referred to as a "steering apparatus") 100 according to the exemplary embodiment is column-assist type, and an apparatus applied to a vehicle such as an automobile with a right-hand steering wheel. The steering apparatus 100 is provided with: a steering shaft 101 that is connected to a steering wheel (not shown); and a steering column 105 that covers the periphery of the steering shaft 101 in the direction of the radius of rotation.

Additionally, the steering apparatus 100 is provided with: a gear box 110 in which a worm wheel 150 and a worm gear 161 to be described later are contained; and a bracket 106 that directly or indirectly fixes the steering column 105 and the gear box 110 to a main flame of the vehicle.

Moreover, the steering apparatus 100 is provided with: an electric motor 160 that gives force for assisting steering force of a driver applied to the steering wheel; the electronic control unit (hereinafter, referred to as the "ECU" in some cases") 10 as an example of a controller that controls operation of the electric motor 160; and a torque sensing device 20 that senses steering torque T of a driver.

The steering shaft 101 has a first rotary shaft 120 whose upper end is to be connected to the steering wheel (not shown), and a second rotary shaft 130 that is coaxially connected to the first rotary shaft 120 through a torsion bar 140. To the second rotary shaft 130, the worm wheel 150 is fixed by, for example, press fitting. The worm wheel 150 is engaged with the worm gear 161 connected to an output shaft of the electric motor 160 fixed to the gear box 110.

The gear box 110 has a first component 110 that rotatably supports the first rotary shaft 120, and a second component 112 that rotatably supports the second rotary shaft 130 and that is connected to the first component 111 with, for example, a bolt. The first component 111 has a motor attachment portion 111*a* that is a region where the electric motor 160 is attached, and an ECU attachment portion 111*b* that is a region where the ECU 10 is attached.

In the steering apparatus 100 having the aforementioned configuration, the torque sensing device 20 senses steering torque T on the basis of a relative rotation angle between the first rotary shaft 120 and the second rotary shaft 130, and the ECU 10 controls driving of the electric motor 160 on the basis of the sensed steering torque T, and transmits the rotation driving power to the second rotary shaft 130 through the worm gear 161 and the worm wheel 150. Thereby, the generating torque of the electric motor 160 assists steering force of a driver which is applied to the steering wheel.

Next, a detailed description will be given for the torque sensing device 20.

The torque sensing device 20 has a relative angle sensor 21 that senses a relative rotation angle between the first rotary shaft 120 and the second rotary shaft 130, and a torque sensor 50 that senses steering torque T on the basis of the relative rotation angle sensed by the relative angle sensor 21.

First, description will be given for the relative angle sensor 21.

Figure 4:
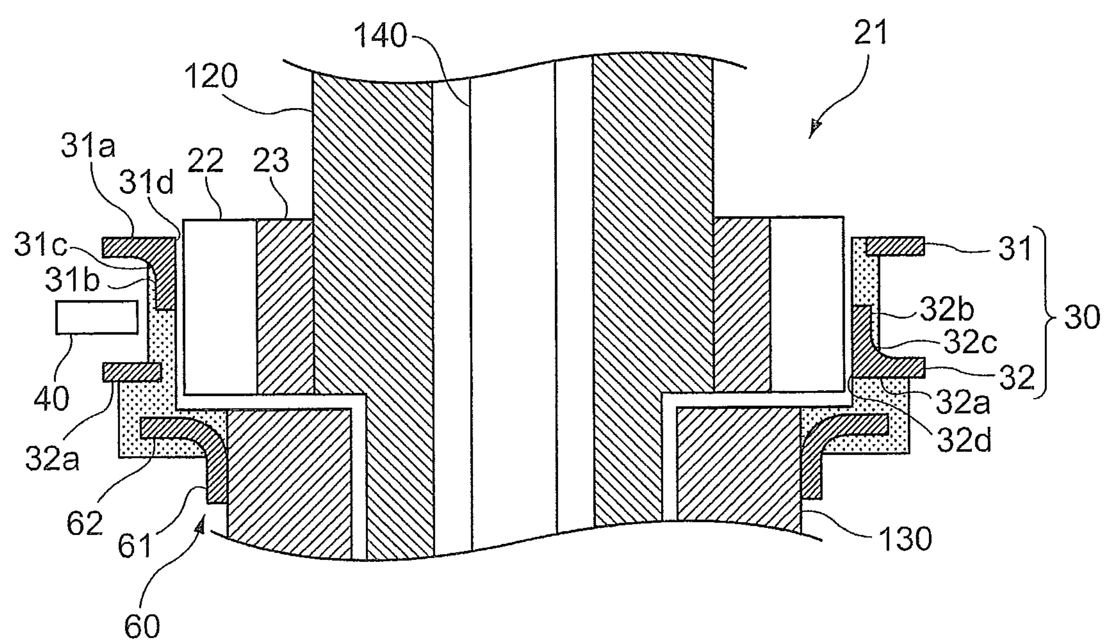
FIG. 4 is an enlarged view of an IV portion in FIG. 3.
Figure 5:
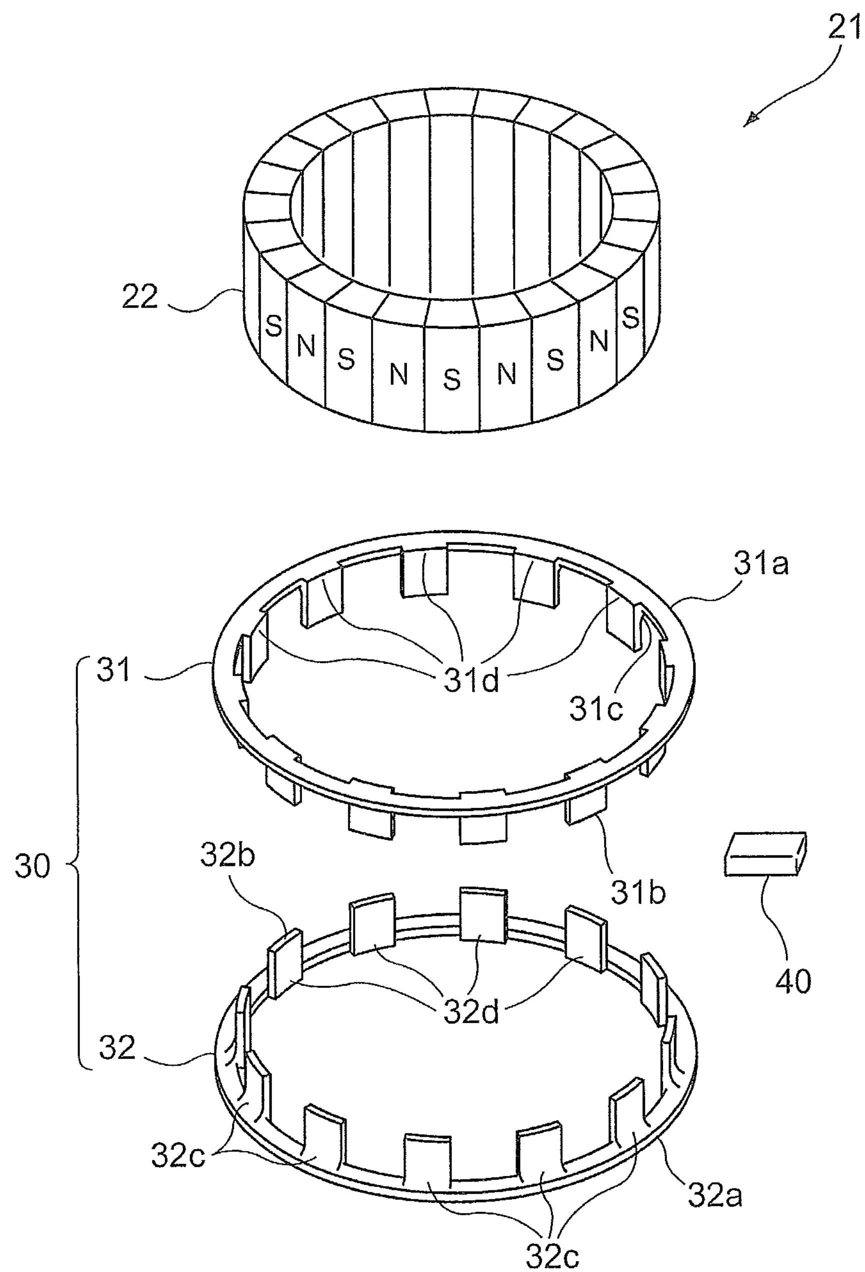
FIG. 5 is a schematic configuration diagram of main components of the relative angle sensor according to the exemplary embodiment.
Figure 6:
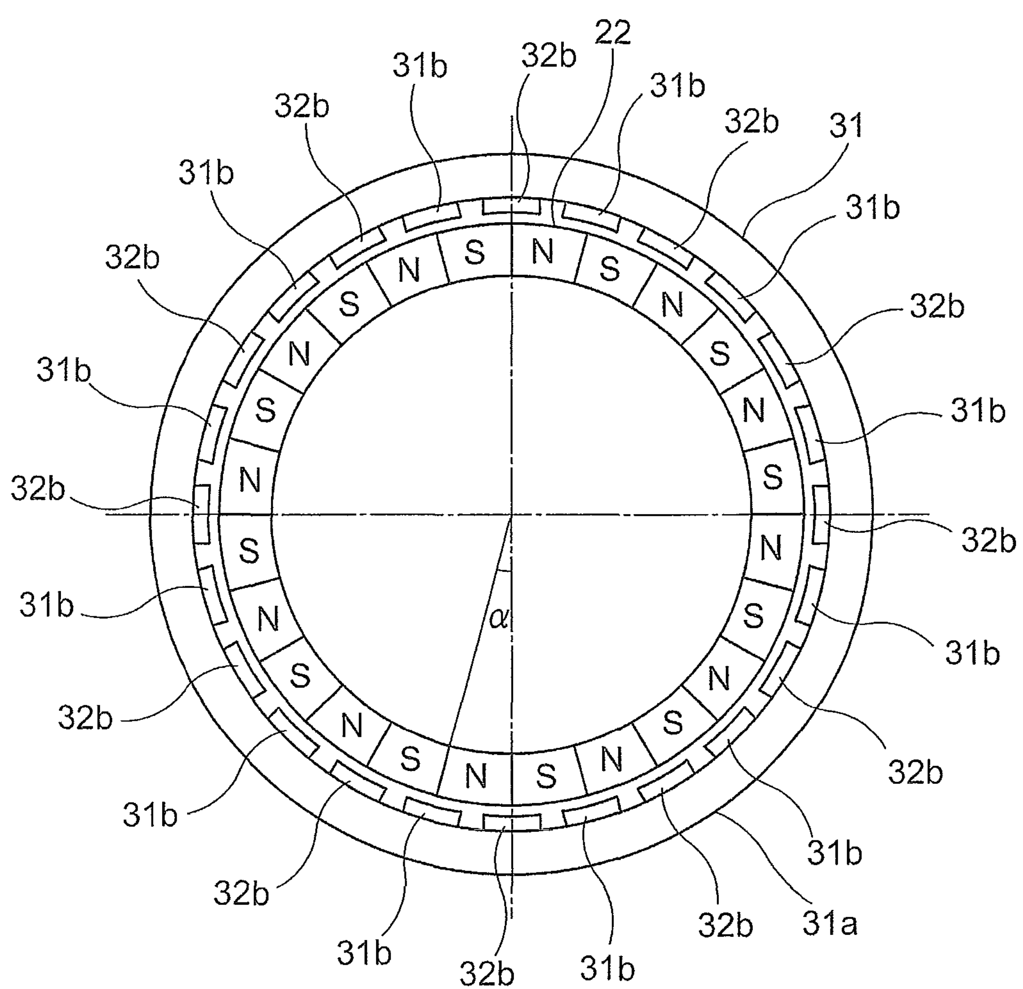
FIG. 6 is a view of the relative angle sensor seen from a VI direction in FIG. 3.

FIG. 4 is an enlarged view of an IV portion in FIG. 3. FIG. 5 is a schematic configuration diagram of main components of the relative angle sensor 21 according to the exemplary embodiment. FIG. 6 is a view of the relative angle sensor 21 seen from a VI direction in FIG. 3. It should be noted that, in FIG. 6, a bracket 60 is omitted.

The relative angle sensor 21 has a magnet 22 as an example of a hard magnetic body attached to the first rotary shaft 120, and a yoke 30 as an example of a soft magnetic body arranged in a magnetic field formed by the magnet 22 and forms a magnetic circuit together with the magnet 22. Additionally, the relative angle sensor 21 has a magnetic sensor 40 that senses a magnetic flux density in the magnetic circuit formed by the magnet 22 and the yoke 30, and the bracket 60 that supports the yoke 30.

The magnet 22 is formed into a cylinder, and, as shown in FIG. 5, north poles and south poles are alternately arranged in the circumferential direction of the first rotary shaft 120 and magnetized in the circumferential direction. The magnet 22 is attached to the first rotary shaft 120 through a collar 23. That is, the magnet 22 is fixed to the collar 23, and the collar 23 is fixed to the first rotary shaft 120. Further, the magnet 22 rotates together with the first rotary shaft 120. It should be noted that the length of the magnet 22 in the shaft direction of the first rotary shaft 120 is longer than the length of the yoke 30.

The yoke 30 has a first yoke 31 and a second yoke 32.

The first yoke 31 has a first circular ring portion 31*a* that is formed into a disc having, at the inside thereof, a hole whose diameter is larger than the outer diameter of the magnet 22, and plural first protrusions 31*b* that are formed to extend from the first circular ring portion 31*a* in the shaft direction of the first rotary shaft 120 (hereinafter, simply referred to as a "shaft direction" in some cases). The first protrusions 31*b* curve along the outer circumferential surface of the magnet 22 in the circumferential direction of the magnet 22.

The second yoke 32 has a second circular ring portion 32*a* that is formed into a disc having, at the inside thereof, a hole whose diameter is larger than the outer diameter of the magnet 22, and plural second protrusions 32*b* that is formed to extend from the second circular ring portion 32*a* in the shaft direction. The second protrusions 32*b* curve along the outer circumferential surface of the magnet 22 in the circumferential direction of the magnet 22.

The first protrusions 31*b* of the first yoke 31 and the second protrusions 32*b* of the second yoke 32 are formed so that the number of these protrusions 31*b* and 32*b* is the same as the number of the north poles and the south poles of the magnet 22. That is, for example, in the case where 12 north poles and 12 south poles are provided in the magnet 22, 12 first protrusions 31*b* are formed and 12 second protrusions 32*b* are formed. The first protrusions 31*b* and the second protrusions 32*b* are arranged slightly outside the outer circumferential surface of the magnet 22 so as to face the outer circumferential surface of the magnet 22 in the direction of the radius of rotation of the first rotary shaft 120 as shown in FIGS. 4 and 6, and the surfaces of the first protrusions 31*b* and the second protrusions 32*b* facing the magnet 22 are formed into a rectangle when seen from the direction orthogonal to the rotary shaft of the first rotary shaft 120. The first protrusions 31*b* and the second protrusions 32*b* are alternately arranged in the circumferential direction of the first rotary shaft 120.

In the state where the steering torque T is not applied to the torsion bar 140, that is, in a neutral state where the torsion bar 140 is not twisted, the torque sensing device 20 according to the exemplary embodiment has an arrangement such that boundaries between the north poles and the south poles of the magnet 22 and the centers of the first protrusions 31*b* of the first yoke 31 in the circumferential direction correspond to each other in the circumferential direction of the first rotary shaft 120 when seen from the clockwise direction, as shown in FIG. 6.

In the neutral state, the second protrusions 32*b* of the second yoke 32 are arranged so that the boundaries between the south poles and the north poles of the magnet 22 and the centers of the second protrusions 32*b* in the circumferential direction correspond to each other in the circumferential direction of the first rotary shaft 120 when seen from the clockwise direction, as shown in FIG. 6. Further, in the case where the steering torque T is applied to the torsion bar 140 to twist the torsion bar 140 and the first protrusions 31*b* face the north poles or the south poles of the magnet 22, the second protrusions 32*b* face the magnetic poles whose polar character is different from that of the magnetic poles the first protrusions 31*b* face.

The bracket 60 has a shaft-direction region 61 that is formed into a cylinder with thin thickness and extends in the shaft direction of the second rotary shaft 130, and a radial-direction region 62 that is formed into a disc and extends from the shaft-direction region 61 in the direction of radius of rotation of the second rotary shaft 130. The shaft-direction region 61 of the bracket 60 is fixed to the second rotary shaft 130 by press fitting, welding, swaging or screwing, and thereby the shaft-direction region 61 is fixed to the second rotary shaft 130. Accordingly, the yoke 30 is fixed to the second rotary shaft 130.

The magnetic sensor 40 is fixed to the gear box 110 through a substrate for sensing 50*a* of the torque sensor 50 which will be described later, and is arranged between the first circular ring portion 31*a* of the first yoke 31 and the second circular ring portion 32*a* of the second yoke 32 in the shaft direction. The magnetic sensor 40 is a sensor that senses the magnetic flux density between the first yoke 31 and the second yoke 32, converts the sensed magnetic flux density into an electric signal (for example, a voltage signal), and outputs the resultant signal, and includes a magnetoresistive element, a hall IC, a hall element and the like, as examples.

Next, description will be given for the torque sensor 50.

The torque sensor 50 is provided with: a memory portion 51 (refer to FIG. 8) that memorizes a reference value as an output value of the magnetic sensor 40 at a neutral state where the steering torque T is not applied to the steering wheel and the torsion bar 140 is not twisted; and an output portion 52 (refer to FIG. 8) that outputs a torque signal as an electric signal (voltage signal in the exemplary embodiment) according to the steering torque T on the basis of the reference value memorized in the memory portion 51 and the output value of the magnetic sensor 40.

The output portion 52 computes difference between the value obtained from the magnetic sensor 40 and the reference value memorized in the memory portion 51, and outputs a first torque signal T1 and a second torque signal T2 as values according to the value obtained by the computation and as two voltage signals having a correlative relationship.

Figure 7:
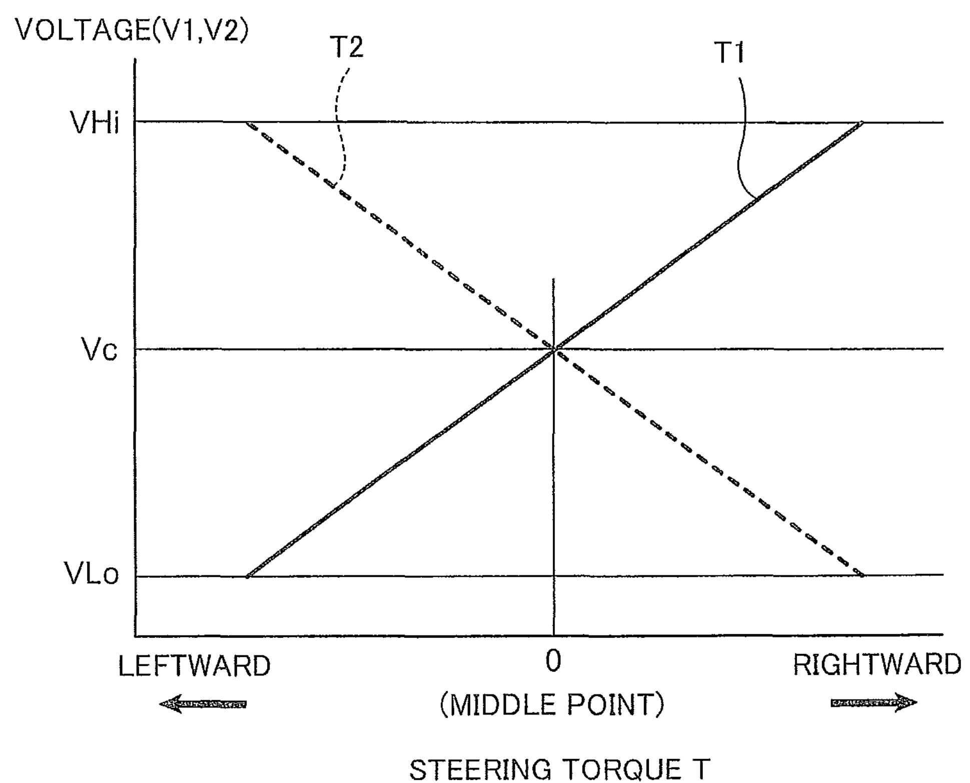
FIG. 7 is a graph showing a relationship between each of the first torque signal and the second torque signal outputted by the output portion of the torque sensor and the steering torque.

FIG. 7 is a graph showing a relationship between each of the first torque signal T1 and the second torque signal T2 outputted by the output portion 52 of the torque sensor 50 and the steering torque T.

In FIG. 7, the horizontal axis shows the steering torque T, and the vertical axis shows a first voltage V1 of the first torque signal T1 and a second voltage V2 of the second torque signal T2. The middle point of the horizontal axis is set to a state in which the steering torque T is zero, that is, the state in which the twisting amount of the torsion bar 140 is zero, the rightward steering torque T is set to be plus, and the leftward steering torque T is set to be minus.

As shown in FIG. 7, the output portion 52 of the torque sensor 50 according to the exemplary embodiment outputs the first torque signal T1 and the second torque signal T2 so that the first voltage V1 given by the first torque signal T1 and the second voltage V2 given by the second torque signal T2 change between the maximum voltage VHi and the minimum voltage VLo. It should be noted that the maximum voltage VHi is set to be slightly lower than the upper limit of the output value the torque sensor 50 is capable of outputting as the first torque signal T1 and the second torque signal T2, and the minimum voltage VLo is set to be slightly higher than the lower limit of the output value the torque sensor 50 is capable of outputting.

As shown by a solid line in FIG. 7, the first torque signal T1 has characteristics in which the voltage increases as the amount of the rightward steering torque T increases (the rotation amount of the torsion bar 140 rotating to the right increases). That is, as the steering wheel rotates to the right, the first voltage V1 of the first torque signal T1 increases. On the other hand, as shown by a broken line in FIG. 7, the second voltage V2 of the second torque signal T2 has characteristics opposite to those of the first torque signal T1 (negatively correlative relationship) in which the voltage decreases as the amount of the rightward steering torque T increases. That is, as the steering wheel rotates to the right, the second voltage V2 of the second torque signal T2 decreases.

At the middle point, the first voltage V1 of the first torque signal T1 and the second voltage V2 of the second torque signal T2 are configured to have the same voltage (hereinafter, referred to as a "middle-point voltage Vc" in some cases). The middle-point voltage Vc is, for example, a voltage at a middle point between the maximum voltage VHi and the minimum voltage VLo (Vc=(VHi+VLo)/2).

Further, rate of change of the first torque signal T1 and rate (absolute value) of change of the second torque signal T2 for change of the steering torque T are equal to each other, and the first torque signal T1 and the second torque signal T2 have characteristics in which a total voltage obtained by adding the first voltage V1 of the first torque signal T1 and the second voltage V2 of the second torque signal T2 given by the same steering torque T is always a predetermined voltage (2Vc).

The torque sensor 50 is configured with the substrate for sensing 50*a* on which the arithmetic logical operational circuit is mounted, which is shown in FIGS. 2 and 3. The output portion 52 outputs the first torque signal T1 and the second torque signal T2 through a lead wire 50*b* connected to the substrate for sensing 50*a*. The lead wire 50*b* is connected to a control substrate 12 of the ECU 10 to be described later. The substrate for sensing 50*a* is supplied with a source voltage and a GND voltage through the lead wire 50*b*.

Next, detailed description will be given for the ECU 10.

Figure 8:
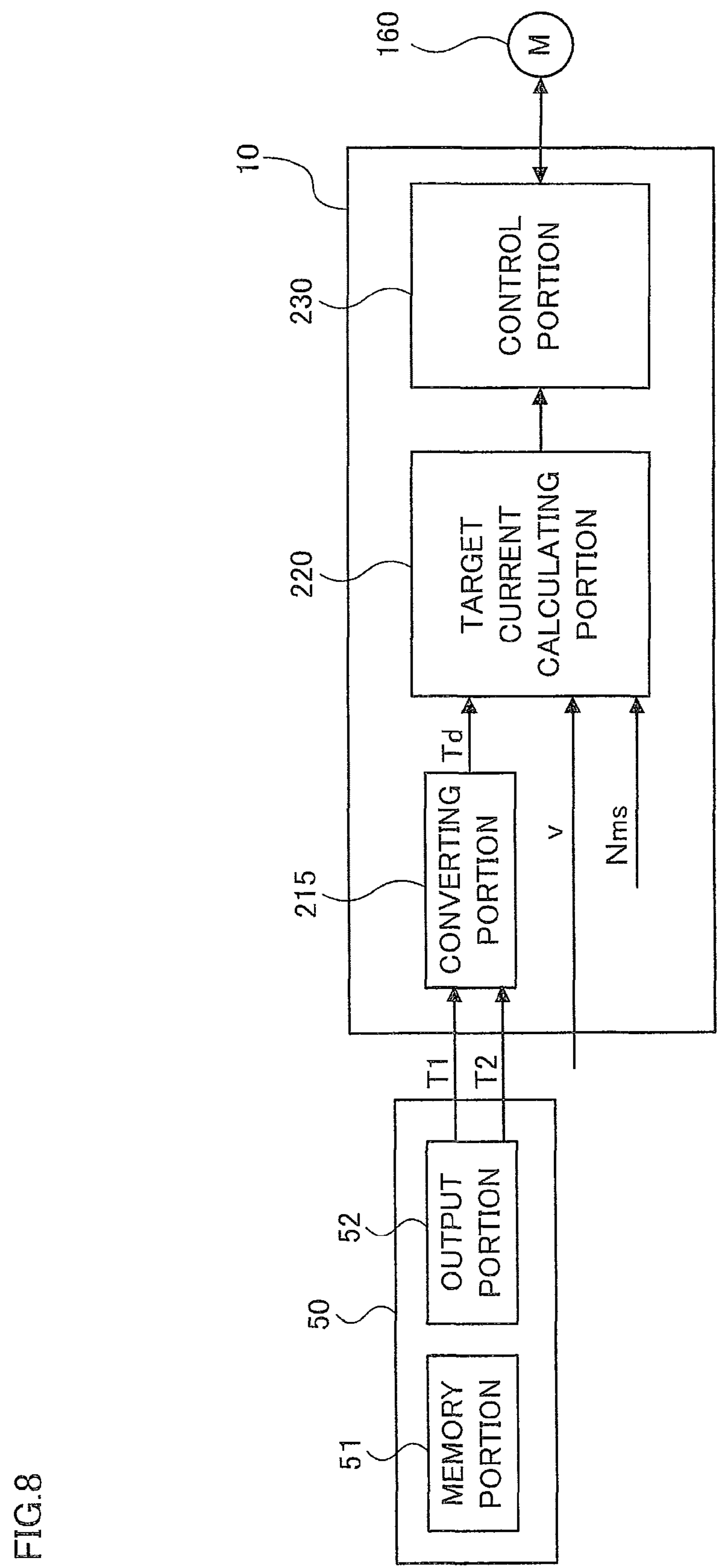
FIG. 8 is a schematic configuration diagram of the ECU of the steering apparatus.

FIG. 8 is a schematic configuration diagram of the ECU 10 of the steering apparatus 100.

To the ECU 10, the aforementioned output signal from the torque sensing device 20, a vehicle speed signal v obtained by converting the vehicle speed sensed by a vehicle speed sensor (not shown) into an output signal, and the like are inputted.

The ECU 10 has a converting portion 215 that converts the output signal from the torque sensing device 20 into the torque signal Td, a target current calculating portion 220 that calculates a target subsidiary torque on the basis of the torque signal Td outputted from the converting portion 215, and calculates a target current necessary for supplying the target subsidiary torque by the electric motor 160, and a control portion 230 that performs feedback control on the basis of the target current calculated by the target current calculating portion 220.

The converting portion 215 diagnoses whether there is an abnormality of the torque sensing device 20, from the first torque signal T1 and the second torque signal T2 outputted from the torque sensing device 20. In the case where there is no abnormality, the converting portion 215 converts the first torque signal T1 into the torque signal Td as a digital signal according to the steering torque T, and outputs the converted torque signal Td to the target current calculating portion 220.

The target current calculating portion 220 is provided with: a base current calculating portion (not shown) that calculates a base current as a reference for setting the target current; an inertia compensation current calculating portion (not shown) that calculates a current for cancelling the inertia moment of the electric motor 160; and a damper compensation current calculating portion (not shown) that calculates a current for restricting rotation of the motor. In addition, the target current calculating portion 220 is provided with: a target current determination portion (not shown) that determines the target current on the basis of the outputs from the base current calculating portion, the inertia compensation current calculating portion, the damper compensation current calculating portion and the like; and a phase compensation portion (not shown) that conducts phase compensation of the torque signal Td. The target current calculating portion 220 calculates the target subsidiary torque on the basis of the torque signal Td outputted from the converting portion 215, and calculates the target current necessary for supplying the target subsidiary torque by the electric motor 160.

The control portion 230 has a motor drive control portion (not shown) that controls actuation of the electric motor 160, a motor drive portion (not shown) that drives the electric motor 160, and a motor current sensing portion (not shown) that senses an actual current Im (not shown) actually flowing through the electric motor 160.

The motor drive control portion has a feedback (F/B) control portion (not shown) that performs feedback control on the basis of the deviation of the actual current Im to be supplied to the electric motor 160 sensed by the motor current sensing portion from the target current finally determined by the target current calculating portion 220, and a PWM (pulse-width modulation) signal generating portion (not shown) that generates a PWM signal for driving the electric motor 160 with PWM.

The motor drive portion is a so-called inverter, and is provided with 6 individual transistors (FET) (not shown) as switching elements. Gates of two transistors selected from the six transistors are driven to perform switching operation for these transistors, and thereby driving of the electric motor 160 is controlled.

The motor current sensing portion senses the value of the actual current Im flowing through the electric motor 160 on the basis of the voltage generated at both ends of a shunt resistance (not shown) connected to the motor drive portion, converts the sensed actual current Im into a motor current signal Ims (not shown), and outputs the motor current signal Ims.

The aforementioned converting portion 215, target current calculating portion 220 and control portion 230 of the ECU 10 are configured with a substrate for the ECU 11 (refer to FIGS. 2 and 3) on which electronic components are mounted. The substrate for the ECU 11 is provided with: the control substrate 12 (refer to FIG. 2) on which a microcomputer and peripheral devices thereof are mounted, which configures the target current calculating portion 220, the motor drive control portion, the motor current sensing portion and the like; and a power substrate 13 (refer to FIG. 2) on which a transistor for driving and controlling the electric motor 160 and the like are mounted, which configures the motor drive portion. In the control substrate 12, insertion holes 12*a* (refer to FIG. 2) for inserting the lead wire 50*b* of the torque sensor 50 are formed. To the power substrate 13, motor terminals 18 that are inserted into the electric motor 160 and electrically connected to a winding terminal (not shown) of the electric motor 160 are attached.

Moreover, the ECU 10 is provided with: a frame 14 (refer to FIG. 2) for attaching the control substrate 12 to the first component 111 of the gear box 110; and the cover 15 (refer to FIG. 1) that covers the control substrate 12, the power substrate 13, the frame 14 and the like.

The frame 14 is composed of an insulating resin and formed by insert molding, has a wiring pattern configured with plural conductive lines, and electrically connects the control substrate 12 and the power substrate 13. To the frame 14, a battery mounted on a vehicle such as an automobile and a connector 16 for connection to a network (CAN) with various kinds of devices mounted on the vehicle are attached (refer to FIGS. 1 and 2).

Next, detailed description will be given for the yoke 30 of the torque sensing device 20.

The yoke 30 is an injection-molding component made of a material obtained by mixing a magnetic powder and a synthetic resin. That is, the yoke 30 is formed by injection molding by using the material obtained by mixing the magnetic powder and the synthetic resin. The magnetic powder is a Fe—Ni alloy having a composition in which 40% by weight or more thereof is Ni (nickel) and the rest is Fe (iron).

The yoke 30 is formed by injection molding together with the metallic bracket 60. That is, the yoke 30 and the bracket 60 are integrally formed by a two-color molding in which a synthetic resin not mixed with the magnetic powder (in which the magnetic powder is not dispersed) is injected around the bracket 60 inserted into a mold and a synthetic resin mixed with the magnetic powder (in which the magnetic powder is dispersed) is injected into a region for the yoke 30. Thereby, the first yoke 31, the second yoke 32 and the bracket 60 are formed as one component, and in this state, they are fixed to the second rotary shaft 130.

In the injection molding using the material obtained by mixing the magnetic powder and the synthetic resin, more complex shape can be formed by a molding tool in comparison with a case where a steel plate is pressed for example, and thereby degree of freedom of a shape of the yoke 30 increases. Thus, by the injection molding, it is possible to form a more complex shape without press work or cutting work. In other words, by the injection molding, a component having a more complex shape can be formed while the amount of the scrap generated by the press work or the cutting work is reduced. In addition, by the injection molding, it is possible to easily produce the yoke 30 in large quantities.

Accordingly, by forming the yoke 30 by the injection molding like the yoke 30 according to the exemplary embodiment, the amount of the material necessary for producing the yoke 30 can be reduced in comparison with the case where the component having the same shape is produced by the method other than the injection molding. That is, the amount of an expensive material containing Ni (nickel) and the like can be reduced. Thereby, the relative angle sensor 21, and the torque sensing device 20 can be produced at low cost.

In consideration of the increase of degree of freedom of the shape of the yoke 30 by the injection molding, a following shape is adopted for the yoke 30 according to the exemplary embodiment in order to realize an efficient magnetic circuit.

That is, distance to the magnet 22 from each of sections 31*c* on the outer circumferential side of the first protrusions 31*b* that is formed to extend from the first circular ring portion 31*a* of the first yoke 31 of the yoke 30 in the shaft direction increases from the tip end portion side toward the base end portion side, that is, toward the first circular ring portion 31*a*. On the other hand, distance to the magnet 22 from each of the sections 31*d* on the inner circumferential side of the first protrusions 31*b* is substantially the same from the tip end portion side to the base end portion side. Similarly, distance to the magnet 22 from each of sections 32*c* on the outer circumferential side of the second protrusions 32*b* that is formed to extend from the second circular ring portion 32*a* of the second yoke 32 of the yoke 30 in the shaft direction increases from the tip end portion side toward the base end portion side, that is, toward the second circular ring portion 32*a*. On the other hand, distance to the magnet 22 from each of the sections 32*d* on the inner circumferential side of the second protrusions 32*b* is substantially the same from the tip end portion side to the base end portion side.

In the yoke 30 having the aforementioned formation, since the distance to the magnet 22 from each of the sections 31*c* (32*c*) on the outer circumferential side of the first protrusions 31*b* (second protrusions 32*b*) increases from the tip end portion side toward the first circular ring portion 31*a* (second circular ring portion 32*a*), magnetic field lines from the first protrusions 31*b* (second protrusions 32*b*) toward the first circular ring portion 31*a* (second circular ring portion 32*a*) and magnetic field lines from the first circular ring portion 31*a* (second circular ring portion 32*a*) toward the first protrusions 31*b* (second protrusion s32*b*) easily pass.

Since the distance to the magnet from each of the sections 31*d* (32*d*) on the inner circumferential side of the first protrusions 31*b* (second protrusion 32*b*) is substantially the same from the tip end portion side to the base end portion side, the region where the first protrusion 31*b* (second protrusion 32*b*) faces the magnet 22 is larger than that of a component in which the section on the inner circumferential side gradually separates from the magnet 22 so as to extend outward from the tip end portion side to the base end portion side. Thus, the amount of magnetic field lines entering and exiting the magnet 22 and the yoke 30 is increased.

As mentioned above, in the yoke 30 according to the exemplary embodiment, it is possible to make the magnetic flux density in the magnetic circuit formed by the magnet 22 and the yoke 30 larger and make the magnetic flux density sensed by the magnetic sensor 40 larger, in comparison with the case where the yoke 30 according to the exemplary embodiment is not adopted. As a result, it is possible to sense the steering torque T in the torque sensing device 20 with higher accuracy.

In other words, if the distance to the magnet 22 from each of the sections 31*c* (32*c*) on the outer circumferential side of the first protrusions 31*b* (second protrusions 32*b*) increases from the tip end portion side toward the first circular ring portion 31*a* (second circular ring portion 32*a*), and/or the distance to the magnet 22 from each of the sections 31*d* (32*d*) on the inner circumferential side of the first protrusions 31*b* (second protrusions 32*b*) is substantially the same from the tip end portion side to the base end portion side, it is possible to make the magnetic flux density in the magnetic circuit uniform even if the thickness of the first protrusions 31*b* (second protrusions 32*b*) and/or the first circular portion 31*a* (second circular portion 32*a*) is reduced, in comparison with the case of adopting the other shape. Thereby, it is possible to reduce the size of the yoke 30 while the sensed accuracy by the torque sensing device 20 is not reduced. As a result, it is possible to obtain the torque sensing device 20 that is inexpensive and has an excellent vehicle mounting property.

Since the magnetic powder used for the material of the yoke 30 according to the exemplary embodiment contains Ni (nickel), holding power is low, and thereby it is possible to decrease hysteresis. If the content percentage of nickel (Ni) in the magnetic powder is 40% by weight or more, effect of decreasing the hysteresis is significantly seen, and thereby the content percentage of Ni (nickel) may be 40% by weight or more. By decreasing the hysteresis, it is possible to make the sensing accuracy of the torque sensing device 20 higher.

It should be noted that, in the aforementioned exemplary embodiment, the description has been given for the yoke 30 is formed by the injection molding by using the material obtained by mixing the magnetic powder and the synthetic resin. However, it is not limited to the yoke 30, and another soft magnetic component may be formed by injection molding by using a material obtained by a magnetic powder and a synthetic resin.

For example, in the case where the torque sensing device 20 is provided with a pair of inducing components that is located at the outside of each of the first yoke 31 and the second yoke 32 of the yoke 30, is located near each of the first yoke 31 and the second yoke 32, and induces magnetic flux from each of the first yoke 31 and the second yoke 32, the pair of induced components may be formed by injection molding by using a material obtained by mixing a magnetic powder and a synthetic resin. By the injection molding, the amount of a material necessary to produce the pair of induced components can be reduced, and the degree of freedom of the shape thereof can be increased.

In the aforementioned exemplary embodiment, the description has been given for the integral formation of the yoke 30 and the metallic bracket 60 by the two-color molding. However, the formation is not limited to this. For example, the yoke 30 is firstly formed by the injection molding by using the material obtained by mixing the magnetic powder and the synthetic resin, and then the yoke 30 and the bracket 60 may be integrated by injecting the synthetic resin not mixed with the magnetic powder (in which the magnetic powder is not dispersed) into a mold in which the yoke 30 and the bracket 60 has been set. On the contrary, the yoke 30 may be finally formed by the injection molding. That is, after the synthetic resin not mixed with the magnetic powder (in which the magnetic powder is not dispersed) is injected into a mold in which a mold having the shape of the yoke 30 and the bracket 60 has been set, the mold having the shape of the yoke 30 is taken out, and then the material obtained by mixing the magnetic powder and the synthetic resin may be injected into the region of the yoke 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relative angle sensing device that senses a relative angle between two rotary shafts comprising:

a hard magnetic body that is provided to one rotary shaft out of the two rotary shafts;

a soft magnetic body that is provided to the other rotary shaft out of the two rotary shafts to be arranged in a magnetic field formed by the hard magnetic body, and forms a magnetic circuit together with the hard magnetic body; and a sensing unit that senses a magnetic flux density of the magnetic circuit, wherein the soft magnetic body is formed by injection molding by using a material obtained by mixing a magnetic powder and a synthetic resin, a bracket that is integral to the soft magnetic body, the bracket including a first portion that is embedded within the soft magnetic body and a second portion that fixes the soft magnetic body to the other rotary shaft, and wherein the soft magnetic body has a circular ring portion that is formed into a disc having, at an inside thereof, a hole larger than an outer shape of the hard magnetic body, and a protrusion that is formed to protrude from a section of the circular ring portion at a hard magnetic body side in a shaft direction of the one rotary shaft, and distance from an outer section of the protrusion to the hard magnetic body increases from a tip end portion side toward the circular ring portion, and distance from an inner section of the protrusion to the hard magnetic body is substantially the same from the tip end portion side toward the circular ring portion.

2. The relative angle sensing device according to claim 1, wherein the magnetic powder that is the material of the soft magnetic body contains nickel.

3. The relative angle sensing device according to claim 1, wherein nickel accounts for 40% or more of the magnetic powder that is the material of the soft magnetic body.

4. The relative angle sensing device according to claim 1, wherein the first portion comprises a portion that extends radially outward relative to the other rotary shaft and the second portion is disposed external to the soft magnetic body and is configured to surround the other rotary shaft.

* * * * *